W. POST & A. KLEINFELDT.
COVER FOR COOKING UTENSILS.
APPLICATION FILED APR. 16, 1914.
1,149,289.
Patented Aug. 10, 1915.
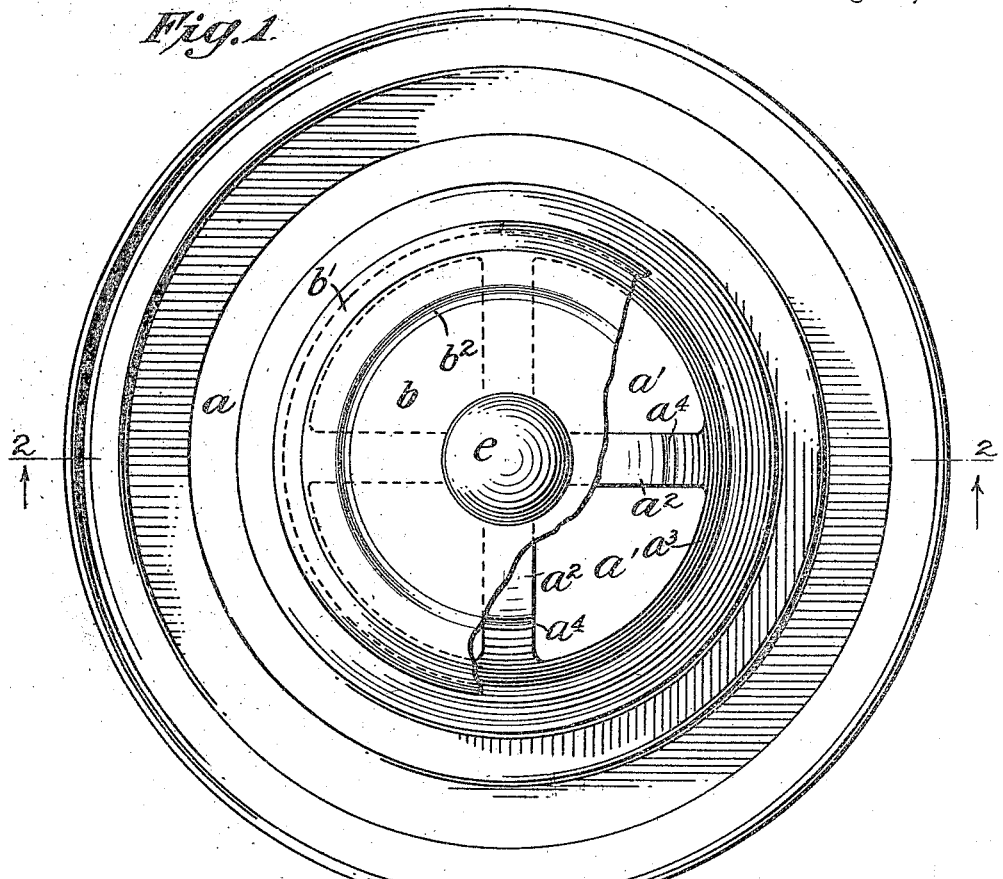
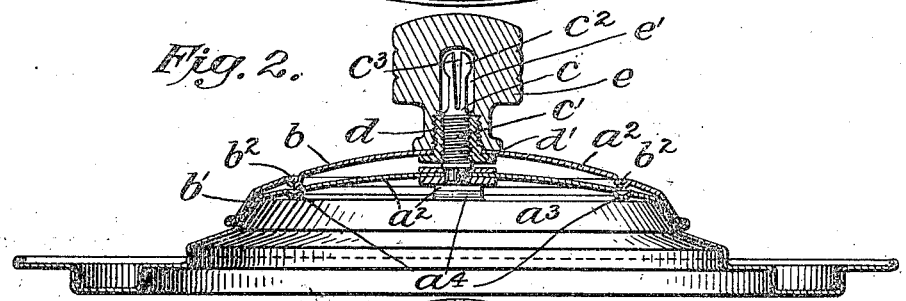
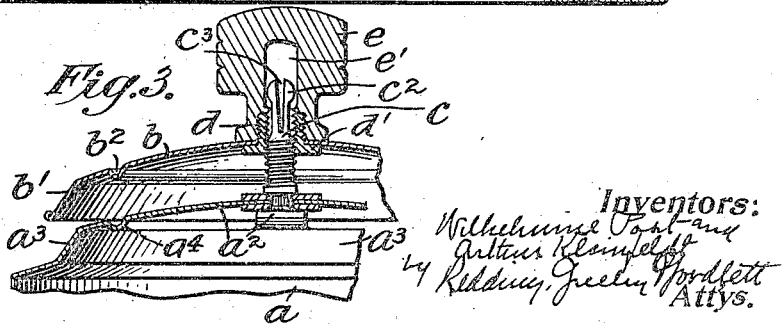

UNITED STATES PATENT OFFICE.

WILHELMINE POST AND ARTHUR KLEINFELDT, OF HOBOKEN, NEW JERSEY.

COVER FOR COOKING UTENSILS.

1,149,289.  Specification of Letters Patent.  Patented Aug. 10, 1915.

Application filed April 16, 1914. Serial No. 832,151.

*To all whom it may concern:*

Be it known that we, WILHELMINE POST and ARTHUR KLEINFELDT, both citizens of the United States, residing in Hoboken, Hudson county, State of New Jersey, have invented certain new and useful Improvements in Covers for Cooking Utensils, of which the following is a specification, reference being had to the accompanying drawing, forming a part hereof.

In the ordinary use of cooking utensils it is sometimes necessary to retain within the utensil the steam or vapors which rise from the food which is being cooked and it is sometimes desirable to permit such steam or vapors to escape. With the ordinary one-piece cover the escape of steam or vapors is usually permitted by moving the cover to one side, thereby leaving the contents of the utensil exposed to flies and to foreign substances which may fall or spatter into the utensil.

It is the object of this invention to provide a cover which can be manipulated either to close tightly the utensil to which it is fitted or to permit the escape of steam or vapors but without permitting the easy entrance of flies or foreign substances.

In accordance with the invention the cover is made in two parts, the main part being provided with an opening or openings and the other part or cap being movable so as to close or open the passage through such openings.

The invention will be more fully explained hereinafter with reference to the accompanying drawing in which it is illustrated and in which—

Figure 1 is a top view of a cover which embodies the invention, a portion of the cap being broken away. Fig. 2 is a view in section on the plane indicated by the line 2—2 of Fig. 1. Fig. 3 is a partial view in section, showing the cap raised to open the passage through the main part of the cover.

The improved cover, which may be formed of any suitable material, comprises a main part $a$ and a cap $b$. The main part $a$ is formed to fit closely the rim of the utensil to which the cover is to be applied and is provided in its central portion with openings $a^1$ between radial spider arms $a^2$, so as to provide a passage for the escape of steam or vapors from the food which is being cooked. At the center of the main part $a$ is secured, in any suitable manner, a stem or spindle $c$ which is preferably threaded at its lower portion as at $c'$, is formed at its upper end with a bead or button $c^2$, and is also split, as at $c^3$ and slightly expanded. The cap $b$ has secured thereto, centrally, a threaded sleeve or nut $d$, which is preferably formed at its lower end with a flange $d'$, is threaded interiorly to engage the threaded stem $c$, and is also threaded externally to be engaged by the knob or handle $e$, the threaded sleeve or nut, the cap $b$ and the knob $e$ being thus securely united so that they shall move together. The knob $e$ is chambered slightly above the sleeve or nut $d$, as at $e'$, so as to receive freely the expanded head of the stem or spindle $c$, the bead or button $c^3$ being expanded so that it will not pass freely through the threaded sleeve or nut $d$ but will yield so as to permit the cap to be removed, by the exertion of a slight force, from the main part of the cover, so that the two parts of the cover may be thoroughly cleaned when desired.

In the use of the improved cover, when it is desired to cover the utensil tightly, the knob $e$ is grasped in the fingers of one hand while the main part $a$ is held by the other hand and the cap is then screwed down to close the openings $a'$ through the main part $a$. If it be desired, however, to permit the steam or vapors to escape, the operation is reversed and the knob is unscrewed, carrying with it the cap $b$ so as to raise the cap from the main part of the cover, as shown in Fig. 3, thus leaving a free passage for the escape of the steam or vapors but not leaving a space through which flies and foreign substances may find easy access to the utensil.

It will be desirable that the main part $a$ of the cover be formed with a conical portion $a^3$ upon which the conical flange $b'$ of the cap $b$ may fit closely. The cap $b$ may also be formed with an internal drip rib $b^2$, if desired, for the purpose of directing the condensed moisture which may gather on the inside of the cap back into the utensil instead of permitting it to run down on the outside of the main part $a$. The radial spider arms $a^2$ may be formed, if necessary, with depressed grooves as at $a^4$ to accommodate the drip rib $b^2$ when the cap is closed tightly. It will be seen that the provision of the expanded bead or button $c^2$ at the upper end of the stem or spindle $c$ prevents the complete separation of the two parts when the knob is completely unscrewed from the stem or spindle and therefore enables the cover to be lifted, although the two parts can be separated for cleaning, as described.

It will be understood that the improved cover may be formed in various ways to suit the utensil or utensils to which it is to be applied and that the invention is not restricted to the precise construction shown.

We claim as our invention:—

A cover for a cooking utensil comprising a main part provided with a conical portion extending upwardly therefrom, said main part having openings within the area surrounded by the conical portion, an imperforate cap mounted on the main part and provided with a conical flange or lip extending downwardly therefrom and arranged to embrace the conical portion of the main part, an internal drip rib formed on the cap, a groove in the main part to accommodate the drip rib, a threaded stem secured to the main part, an internally threaded nut secured to the cap and adapted to engage the threaded portion of the stem whereby the cap may be moved axially and set in adjusted position with respect to the main part to close or open the passage through said openings without moving out of alinement with the openings, the conical flange of the cap preventing foreign particles from falling or spattering into the utensil when the cap is opened, a knob or handle secured to the threaded nut and chambered interiorly, and a yielding button at the upper end of the stem adapted to rest freely in said chamber and to engage the threaded nut yieldingly to maintain the two parts of the cover in releasable engagement with each other when the spindle is not engaged by the nut.

This specification signed and witnessed this thirteenth day of April A. D., 1914.

WILHELMINE POST.
ARTHUR KLEINFELDT.

Signed in the presence of—
 BRUNO PRIEMER,
 ABRAHAM SACKS.